(12) United States Patent
Riddoch

(10) Patent No.: US 6,674,369 B1
(45) Date of Patent: Jan. 6, 2004

(54) FAN CONTROL CIRCUIT

(75) Inventor: Henry J. Riddoch, Wemyss Bay (GB)

(73) Assignee: Minebea Co., Ltd. (JP)

( * ) Notice: Subject to any disclaimer, the term of this patent is extended or adjusted under 35 U.S.C. 154(b) by 0 days.

(21) Appl. No.: 09/485,783

(22) PCT Filed: Aug. 14, 1998

(86) PCT No.: PCT/GB98/02351

§ 371 (c)(1),
(2), (4) Date: Jun. 12, 2000

(87) PCT Pub. No.: WO99/09642

PCT Pub. Date: Feb. 25, 1999

(30) Foreign Application Priority Data

Aug. 15, 1997 (GB) .............................. 9717242

(51) Int. Cl.$^7$ .............................................. G08B 21/00
(52) U.S. Cl. ........................ 340/648; 340/635; 361/103; 361/695
(58) Field of Search .................. 340/648, 584, 340/595, 679, 693.5, 693.9, 635; 361/717, 101–103, 695, 696, 694; 310/68 B, 68 C; 454/184, 187; 318/471, 138, 254

(56) References Cited

U.S. PATENT DOCUMENTS

| | | | | |
|---|---|---|---|---|
| 4,724,678 A | * | 2/1988 | Pohl | 62/80 |
| 5,457,766 A | * | 10/1995 | Ko | 388/831 |
| 5,534,854 A | * | 7/1996 | Bradbury et al. | 340/648 |
| 5,727,928 A | * | 3/1998 | Brown | 417/44.11 |
| 5,769,705 A | * | 6/1998 | O'Callaghan et al. | 454/184 |
| 5,831,405 A | * | 11/1998 | Massie | 318/471 |
| 5,889,469 A | * | 3/1999 | Mykytiuk et al. | 340/635 |
| 5,920,264 A | * | 7/1999 | Kim et al. | 340/584 |
| 5,977,733 A | * | 11/1999 | Chen | 318/434 |
| 6,023,402 A | * | 2/2000 | Kaminski | 361/103 |
| 6,396,231 B1 | * | 5/2002 | Horng et al. | 318/471 |

* cited by examiner

Primary Examiner—Toan Pham
(74) Attorney, Agent, or Firm—Ipsolon LLP

(57) ABSTRACT

There is described a circuit for controlling the operation of a fan. The circuit operates to control the speed of the fan and to operate the means to monitor fan malfunctioning.

10 Claims, 5 Drawing Sheets

FAN CONTROL CIRCUIT

The present invention relates to a circuit and especially but not exclusively to a circuit for use in controlling one or more fans with reference to temperature, and for detecting the failure or inadequacy of the fan or temperature sensors. WO 96/09688 discloses a circuit for controlling the driving voltage of a fan in electrical equipment in response to an input voltage from a thermistor. Control of the voltage with temperature is desirable to in crease the operating speed, and hence cooling effect, of a fan if the temperature of the area to be cooled rises.

The circuit of WO 96/09688 uses the commutated signal at the input of the fan to provide detection pulses allowing the speed of rotation of the fan to be determined. The detection pulses are converted to provide a signal which has, for each control pulse, a retriggerable pulse with a predetermined length, and a no-pulse period. The length of the no-pulse period increases as the difference between the actual fan speed and the desired fan speed (as determined by an input control voltage) increases. The signal is used for influencing the charge state of a storage component by asymmetrically charging and discharging the storage component with the alternate pulse and no-pulse period, so that discharging occurs considerably more quickly than charging. The storage component (a capacitor) is connected to the ground reference point of the circuit. The change in the charge state of the storage component provides a voltage to the base of a transistor which provides a driving voltage for the fan. The collector of the transistor is connected to the ground reference point of the circuit and the emitter is connected to the fan to provide a driving voltage.

The known circuit is illustrated schematically in FIG. 1, and is described further, with reference to FIG. 1, in the specific description of the preferred embodiments.

According to a first aspect of the present invention there is provided a control circuit for controlling a fan in which a commutated signal indicative of the fan speed is processed with reference to a reference signal indicative of a desired fan speed in order to give a control signal, wherein the control signal is processed via a charge/discharge circuit to generate a control voltage which is used to control the operating speed of the fan, and wherein there is provided means to monitor said control voltage to detect inadequate fan functioning.

Preferably the means to monitor the control voltage includes a comparator allowing said control voltage to be compared to a reference voltage, and wherein inadequate fan function is indicated either by said control voltage exceeding, or by said control voltage falling below, said reference voltage.

Preferably, a control signal is provided by a temperature sensitive device. Preferably, the temperature sensitive device is a thermistor.

Preferably, there are provided a number of temperature sensitive devices connected to the control circuit such that the output of the temperature sensitive device which corresponds to the temperature requiring the highest fan speed is utilised to provide the control signal. There may be provided a number of fans, each with a corresponding control circuit. Each temperature sensitive device may provide a control signal for one or more of the fans.

Where a temperature sensitive device provides a control signal for more than one fan, there is preferably included means to enable the temperature sensitive device to provide a control signal which is not dependent upon the number of fans. Said means may be an emitter follower circuit.

Preferably there is provided means to set a maximum fan speed. The means to set a maximum fan speed may comprise a means to provide a maximum fan speed signal, and means to utilise only one of:
 a) the maximum fan speed signal; and
 b) a variable signal provided to affect fan speed;
to control the fan speed, wherein the signal which is utilised is that which requires the lower fan speed.

Preferably there is provided means to set a minimum fan speed. The means to set a minimum fan speed may comprise means to provide a minimum fan speed signal,
and means to utilise only one of:
 a) the minimum fan speed signal; and
 b) a variable signal provided to affect fan speed;
to control the fan speed, wherein the signal which is utilised is that which requires the higher fan speed.

Preferably, there is provided means to provide a warning signal in response to a detected temperature exceeding a given predetermined temperature.

Preferably, there is provided means to provide a warning signal, and/or turn off one or more fans, in response to a detected temperature falling below a given predetermined temperature.

Preferably, there is provided means to provide a control signal which results in all fans being turned off. Such control signal may be provided as a result of an input to the circuit.

Embodiments of the invention will now be described, by way of example only, with reference to the accompanying drawings in which.

Figure 1:
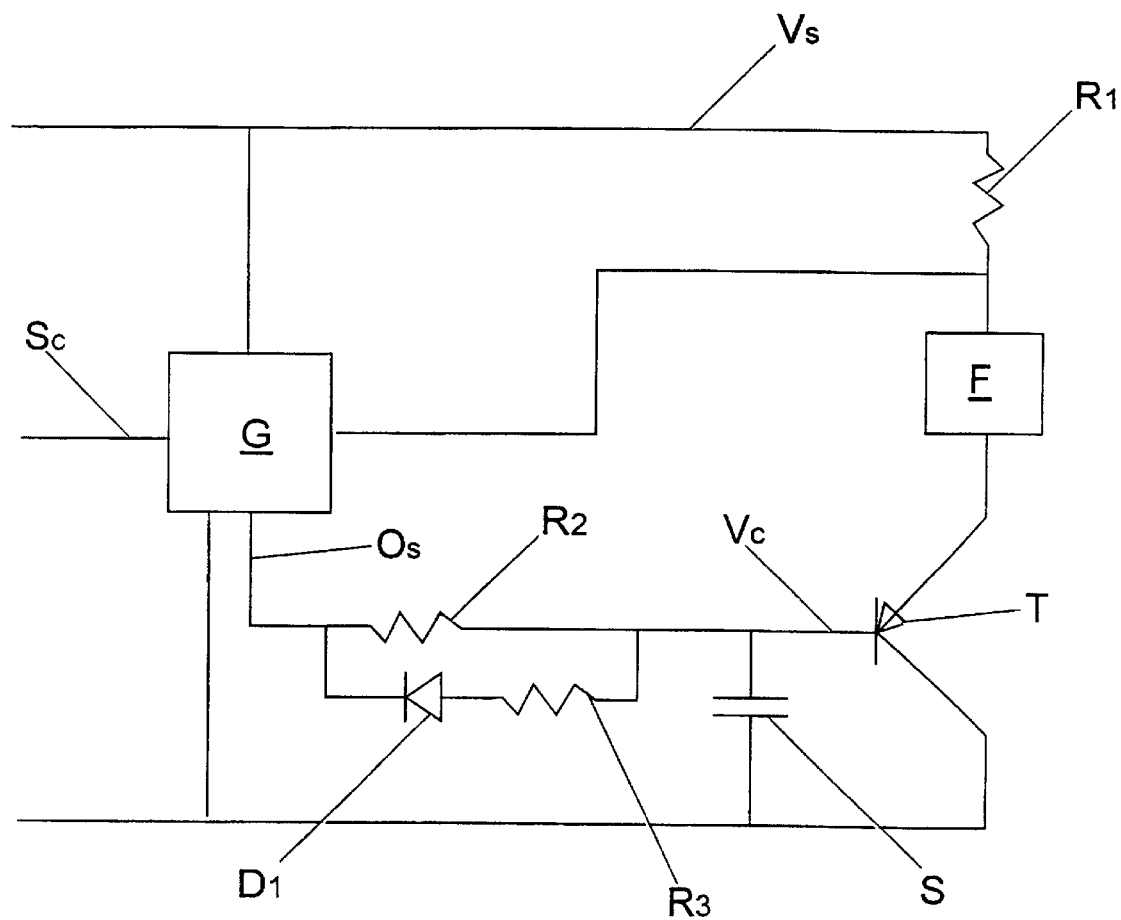
FIG. 1 is a schematic illustration of a known circuit for controlling a fan.

With reference to FIG. 1, a known circuit for controlling a fan F, as described in the introduction above, includes a fan F which is connected to a supply voltage, and a first resistor $R_1$ which is in series with the fan and is between the fan and the supply voltage source $V_s$. On the other side of the fan F is an amplifier circuit T, in the form of at least one pnp type transistor, the collector terminal of which is connected to the ground reference line of the circuit, and the base terminal of which receives a control voltage $V_c$ from a storage component S, which is in the form of a capacitor in this embodiment.

An evaluation and generation circuit G is provided in parallel with the first resistor $R_1$. The evaluation and generation circuit G receives detection pulses from the fan input and provides a pulsed output signal $O_s$ with characteristics dependent on the frequency of the detection pulses from the fan input. The relationship between detection pulses of a given frequency and the characteristics of the pulsed output signal $O_s$ is, in this embodiment, determined by a control signal $S_c$ provided as, for example, a signal from a thermistor, thus enabling the characteristics of the output signal $O_s$ which is used to control the fan speed, to be dependent upon a temperature reading. The pulsed output signal $O_s$ comprises one pulse of prescribed length for each detection pulse, and a non-pulse period which is longer in duration as the deviation between the desired speed (as determined by the control signal $S_c$) and the actual fan speed increases.

Between the storage component S and the evaluation and generation circuit G is an asymmetrical resistance circuit $D_1$, $R_2$, $R_3$, which in this embodiment comprises two elements in parallel, the first element comprising a resistor $R_2$ and the second element comprising a resistor $R_3$ in series with a diode $D_1$.

The output signal $O_s$, comprising a pulsed signal which has a no-pulse period which increases in duration as the deviation of the actual fan speed from the desired fan speed increases, drives the storage component S via the asymmetric resistance circuit. The control voltage $V_c$ constitutes a measure of the deviation of the actual from desired fan speed, and the lower the control voltage, the greater the voltage applied to the fan via the amplifier circuit T and the faster the fan is driven, thus raising the actual fan speed towards (or to) the desired fan speed.

Figure 2:
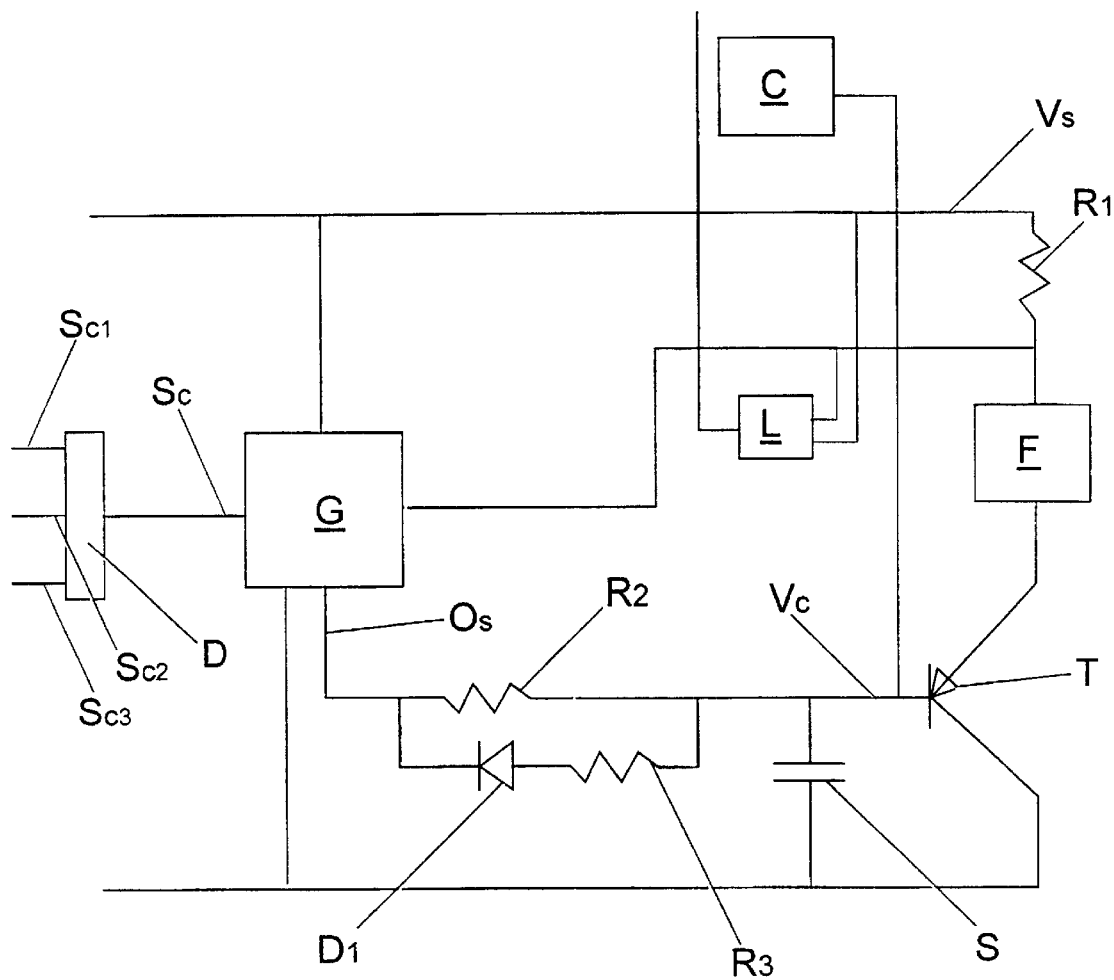
FIG. 2 is a schematic illustration of an embodiment of a circuit in accordance with the present invention.
Figure 3:
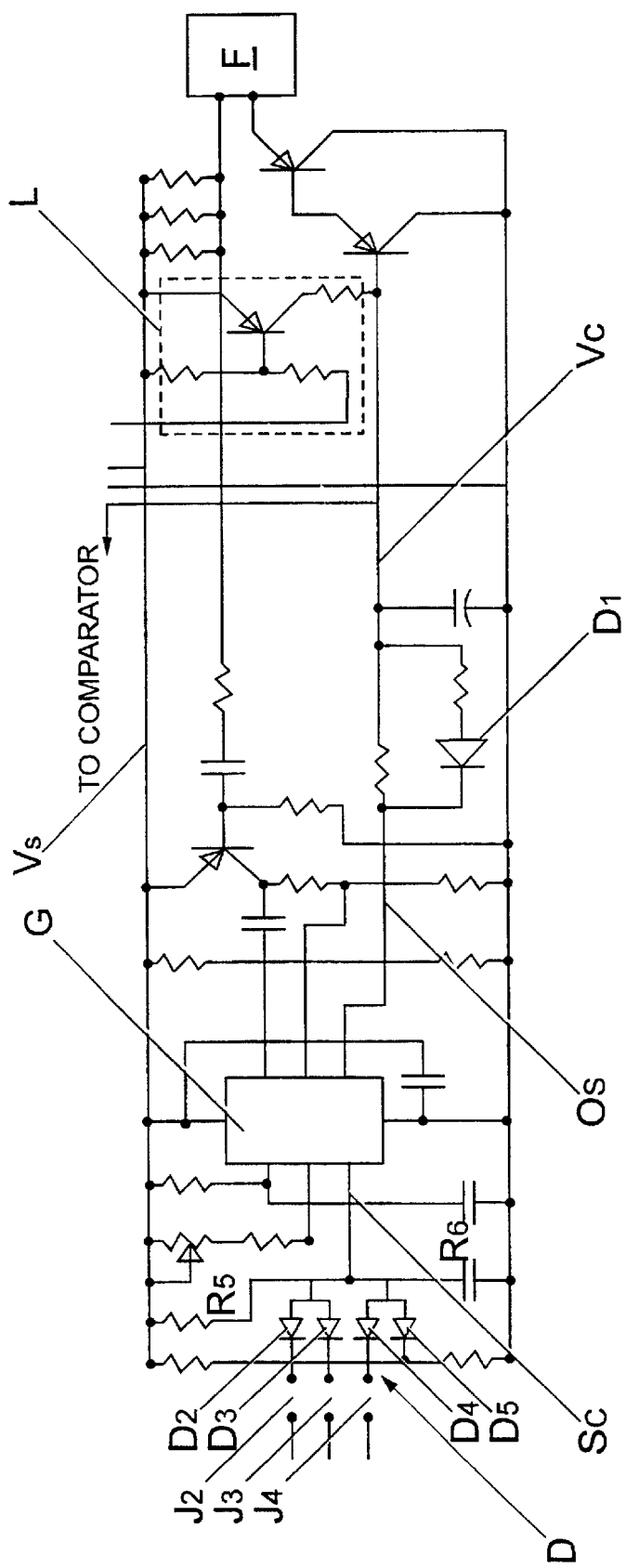
FIG. 3 is a circuit diagram showing detail of an embodiment of the present invention.

FIG. 2 shows an embodiment of a circuit in accordance with the present invention. Most of the components shown in FIG. 2 have already been described with reference to FIG. 1 and corresponding components are designated by corresponding references. However, the embodiment of FIG. 2 includes several further, schematically illustrated, components. FIG. 3 shows a more-detailed circuit diagram corresponding to a preferred embodiment of the circuit of FIG. 2.

A comparator C is included to compare the control voltage $V_c$ to a predetermined voltage. When $V_c$ falls below the predetermined voltage an alarm (not shown in FIG. 2 or 3) is triggered. As discussed above, the control voltage $V_c$ drops as the disparity between actual and desired fan speed increases (assuming that the fan speed is below the desired speed). When $V_c$ is below a given threshold this indicates that the disparity between actual and desired fan speed is above a given threshold, and that the fan is far from its required level of operation. Use of the comparator C thus provides a simple means of determining when fan function is inadequate, and of providing an alarm to indicate this and warn of possible overheating of the elements to be cooled. Inadequate fan function will usually be as a result of disconnection, malfunction or damage to the fan or motor, but may be because of unusually high ambient temperature or some other reason.

The circuit of FIG. 2 also includes an input element D allowing a number of control signals $S_{c1}$, $S_{c2}$, $S_{c3}$ to be fed to the circuit. The input element D allows only the control signal that corresponds to the highest desired fan speed to be passed to the evaluation and generation circuit G. This enables the circuit to be connected to, for example, a number of thermistors, and to provide a level of fan function corresponding to that required by the thermistor which requires the highest fan speed. Thus the fan can be controlled from a number of different locations and provide adequate cooling for all of those locations.

In the embodiment of FIG. 3 the input element D is shown as a diode OR circuit comprising a number of diodes $D_2$, $D_3$, $D_4$, each connected to an input by a respective jumper connector, $J_2$, $J_3$, $J_4$. The control signal $S_c$ is fed from the input element D to the evaluation and generation circuit G which comprises a timer circuit in this embodiment. Use of negative temperature coefficient thermistors (not shown in FIG. 2 or 3) provides a suitable control signal $S_c$ to make the fan run faster as the temperature at the thermistors rises.

The input element D includes a further diode $D_5$ with an input connected into a resistor divider chain comprising resistors $R_5$ and $R_6$ between the supply voltage source and the ground reference line. A predetermined voltage is thus supplied to the diode $D_5$, the value of the predetermined voltage being determined by the value of the resistors $R_5$ and $R_6$ in the chain. The predetermined voltage provided to the diode $D_5$ corresponds to a minimum desired fan speed. Thus a minimum fan speed is set, which applies even if the control signals $S_{c1}$, $S_{c2}$, $S_{c3}$ correspond to a lower fan speed.

As shown in FIGS. 2 and 3 the control voltage $V_c$ is fed to the comparator C.

If desired, a number of comparators can be provided to monitor control voltages of a number of fan control circuits and provide an alarm signal corresponding to the control circuit in which inadequate fan function is detected.

Figure 4:
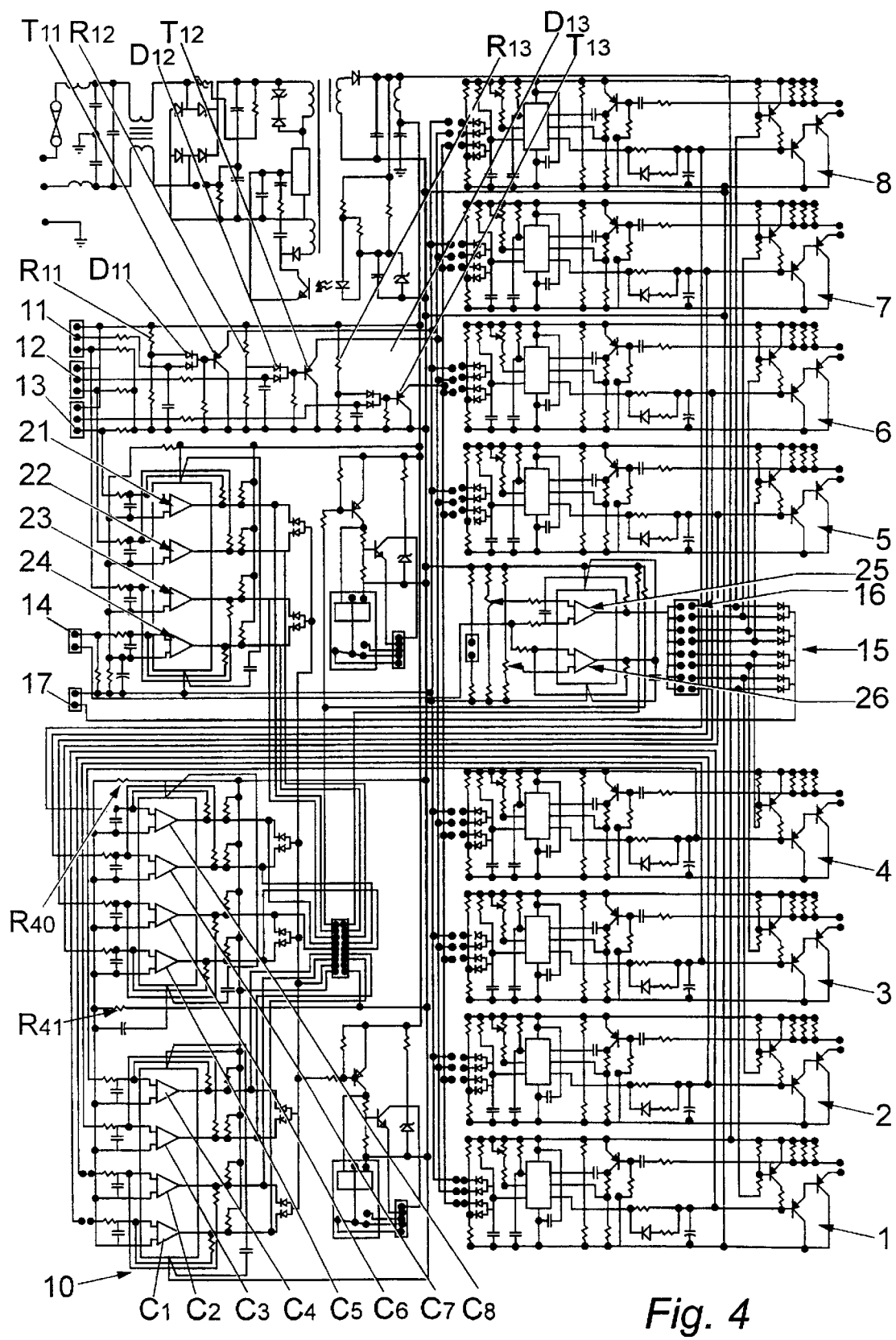
FIG. 4 is a circuit diagram showing eight circuits for controlling fans, and further auxiliary features.

FIG. 4 shows a composite circuit in which a number of fans are provided and each is provided with a respective circuit, designated by the numerals 1 to 8, of the type shown in FIGS. 2 and 3. A series of three thermistors 11, 12, 13 is used to control fan speed. A comparator arrangement 10 can be used to monitor for inadequate fan function. In the illustrated embodiment the comparator arrangement 10 includes eight comparators $C_1$ to $C_8$ corresponding respectively to the eight fan circuits 1 to 8.

Additional thermistors (not shown) may be included to provide inputs for only selected fans, so that those selected fans can be overridden by the additional thermistor inputs.

An additional monitoring thermistor 14, which acts through a comparator and logic circuit 15, is provided to generate an alarm signal when the detected temperature is above a predetermined value, and provide a warning signal and turn selected fans off when the detected temperature is below a predetermined value. The comparator and logic circuit 15 includes comparators 25 and 26 which are used to monitor for high temperature and low temperature conditions. The low temperature comparator output acts through a selection element 16 to provide a signal to override element L in each fan circuit 1 to 8 to turn selected fans off when the detected temperature is below a predetermined level. The comparator and logic circuit 15 can also act in each fan circuit 1 to 8 via respective override elements L, shown in FIGS. 2 and 3, to allow all fans to be turned off in response to an input signal from an input signal element 17.

Where a thermistor 11, 12, 13 provides control signals for a number of fans, an emitter follower circuit may be used in order to provide the same voltage output irrespective of the number of fan circuits to which control signals are sent. Alternatives to an emitter follower circuit may also be used. Diagnostic circuitry may be used in order to provide a warning in the event of a thermistor malfunctioning or becoming damaged, for example, the voltage across a resistor or a diode in the bottom end of a thermistor divide chain may be monitored, and malfunction/disconnection indicated by the voltage falling below a given predetermined level. In embodiment of FIG. 4, comparators 21, 22, 23 are used to monitor the three thermistors 11, 12, 13.

The embodiment of FIG. 4 includes means to control the signals from the thermistors 11, 12, 13 so that a maximum fan speed can be set. Each of the thermistors 11, 12, 13 is provided with a corresponding diode pair, designated $D_{11}$, $D_{12}$, $D_{13}$, respectively, connected to the base of a corresponding transistor, designated $T_{11}$, $T_{12}$, $T_{13}$, respectively. Each diode pair selectively provides to its corresponding transistor a voltage signal corresponding either to the lower of the voltage output of the respective thermistor or to a predetermined voltage, set to provide a maximum desired fan speed, from a corresponding resistor divider chain $R_{11}$, $R_{12}$, $R_{13}$. Thus a maximum fan speed is set, which applies even if the outputs from the thermistors correspond to a higher fan speed.

In the embodiment described with reference to FIG. 4, a common threshold signal is fed to each of the comparators C1–C8. This threshold signal is in the form of a reference voltage derived as a function of the ratio of preset resistors $R_{40}$ and $R_{41}$. The values of the resistors $R_{40}$ and $R_{41}$ are chosen such that under normal operating conditions, (ie, full speed) the voltage applied to the base of the fan controlling transistor would never be more negative than this value.

There is a requirement to determine if any of the fans being controlled require a higher than anticipated voltage to reach the speed determined by the speed signal. This requirement is achieved by the circuits illustrated in FIGS. 5 and 6 which modify the circuits shown in FIG. 4.

Figure 5:
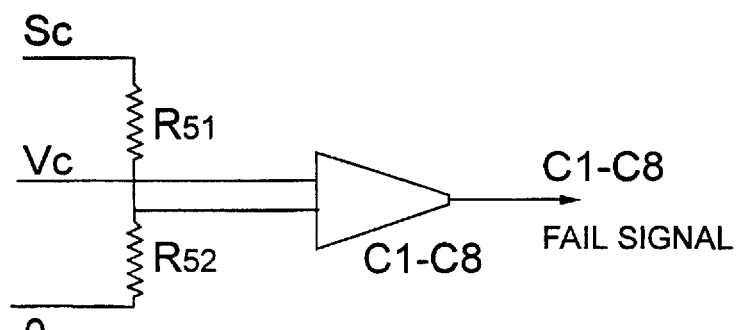
FIG. 5 is a circuit diagram showing a modification.

Referring to FIG. 5, a signal fed to each of the comparators is derived from a resistor divider network $R_{51}, R_{52}$ fed by the speed control signal $S_c$. In this way a variable threshold, dependent on the speed of the fan is fed into the comparators C1–C8. This arrangement also allows the individual threshold for each comparator.

In an alternative further improvement (FIG. 6), there is included a circuit which creates a threshold level arranged to match the performance characteristics of the individual fan. The circuit shown in FIG. 6 employs two operational amplifiers OP1 and OP2.

The use of the two operational amplifiers permits the control signal $S_c$ to be modified to match the performance characteristics of the fan exactly.

Figure 6:
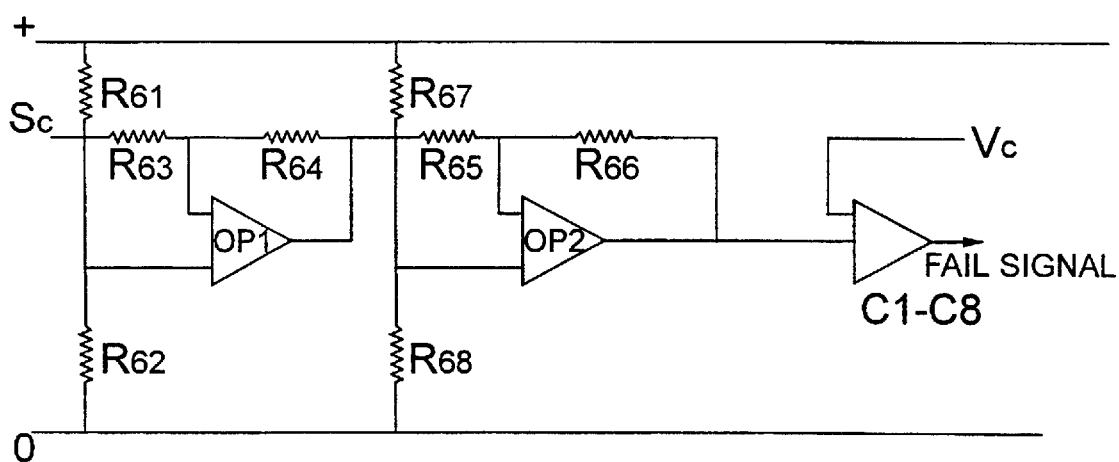
FIG. 6 is a circuit diagram showing a further modification.

As can be seen from FIG. 6, each of the operational amplifiers OP1 and OP2 is provided with respective gain controlling resistors $R_{63}/R_{64}$ and $R_{65}/R_{66}$ and respective offset controlling resistors $R_{61}/R_{62}$ and $R_{67}/R_{68}$.

Accordingly the modifications illustrated in FIGS. 5 and 6 generate individual reference voltages for each fan, these voltages being representative of that fan's respective speed demand signal $S_c$.

The described embodiments thus provide a circuit for controlling at least one fan in which an early warning of fan failure can be conveniently and economically provided. Any desired number of fans may be monitored by a suitable, relatively simple, comparator arrangement. An arbitrary number of thermistors may be used to control an arbitrary number of fans, and the fans may react to the thermistor signal requiring the highest fan speed, thereby ensuring that adequate cooling is provided. Minimum and/or maximum desired fan speeds may be preset.

Modifications and improvements may be incorporated without departing from the scope of the invention. In a preferred embodiment hysteresis is provided around the comparators to avoid jitter.

What is claimed is:

1. A control circuit for controlling a fan in which a commutated signal indicative of the fan speed is processed with reference to a reference signal indicative of a desired fan speed in order to give a control signal, wherein the control signal is processed via an evaluation and generation circuit to generate a control voltage which is used to control the operating speed of the fan, and wherein there is provided means to monitor said control voltage to detect inadequate fan functioning; and an input element connected to the control circuit and operable for selecting only one of among a plurality of signals that represent a plurality of desired fan speeds and for providing the selected signal for processing by the evaluation and generation circuit.

2. A control circuit as claimed in claim 1, wherein the means to monitor the control voltage includes a comparator allowing said control voltage to be compared to a reference voltage, and wherein inadequate fan function is indicated either by said control voltage exceeding, or by said control voltage falling below, said reference voltage.

3. A control circuit as claimed in claim 1, wherein said control voltage is derived from a control signal provided by a temperature sensitive device.

4. A control circuit as claimed in claim 3, wherein the temperature sensitive device is a thermistor.

5. A control circuit as claimed in claim 3, wherein there is provided a number of temperature sensitive devices connected to the control circuit such that the output of the temperature sensitive device which corresponds to the temperature requiring the highest fan speed is utilized to provide the control signal.

6. A control circuit as claimed in claim 1 and including means to set a maximum fan speed, said means comprising a means to provide a maximum fan speed signal, and means to utilize only one of:

a) the maximum fan speed signals; and b) a variable signal provided to affect fan speed to control the fan speed, wherein the signal which is utilized is that which requires the lower fan speed.

7. A control circuit as claimed in claim 1 and including means to set a minimum fan speed, said means comprising means to provide a minimum fan speed signal, and means to utilize only one of:

a) the minimum fan speed signal; and b) a variable signal provided to affect fan speed to control the fan speed, wherein the signal which is utilized is that which requires the higher fan speed.

8. A control circuit as claimed in claim 1 and including means to provide a warning signal in response to a detected temperature exceeding a given predetermined temperature.

9. A control circuit as claimed in claim 1 and including means to provide a warning signal, and/or turn off one or more fans, in response to a detected temperature falling below a given predetermined temperature.

10. The control circuit of claim 1 wherein the input element receives the plurality of control signals from a plurality of different locations relative to the fan.

* * * * *